3 Sheets—Sheet 1.

H. M. BARNHART & E. HUBER.

TRAVELING CRANE.

No. 10,470. Reissued Apr. 22, 1884.

WITNESSES:

Fred. L. Dieterich.

Arthur C. Morsell.

INVENTORS,

Henry M. Barnhart,

Edward Huber,

By Louis Bagger & Co

ATTORNEYS.

3 Sheets—Sheet 2.

H. M. BARNHART & E. HUBER.

TRAVELING CRANE.

No. 10,470. Reissued Apr. 22, 1884.

WITNESSES:

Fred. G. Dieterich.

Arthur L. McKell.

INVENTOR.

Henry M. Barnhart

Edward Huber,

By Louis Bagger & Co.

ATTORNEYS.

H. M. BARNHART & E. HUBER.

TRAVELING CRANE.

No. 10,470. Reissued Apr. 22, 1884.

WITNESSES:

Fred. G. Dieterich.
Arthur L. Morrell.

INVENTOR.
Henry M. Barnhart,
Edward Huber,
By Louis Bagger & Co.
ATTORNEYS.

UNITED STATES PATENT OFFICE.

HENRY M. BARNHART AND EDWARD HUBER, OF MARION, OHIO.

TRAVELING CRANE.

SPECIFICATION forming part of Reissued Letters Patent No. 10,470, dated April 22, 1884.

Original No. 285,100, dated September 18, 1883. Application for reissue filed January 11, 1884.

*To all whom it may concern:*

Be it known that we, HENRY M. BARNHART and EDWARD HUBER, citizens of the United States, and residents of Marion, in the county of Marion and State of Ohio, have invented certain new and useful Improvements in Traveling Cranes; and we do hereby declare that the following is a full, clear, and exact description of the invention, which will enable others skilled in the art to which it appertains to make and use the same, reference being had to the accompanying drawings, which form a part of this specification, and in which—

Figure 1:
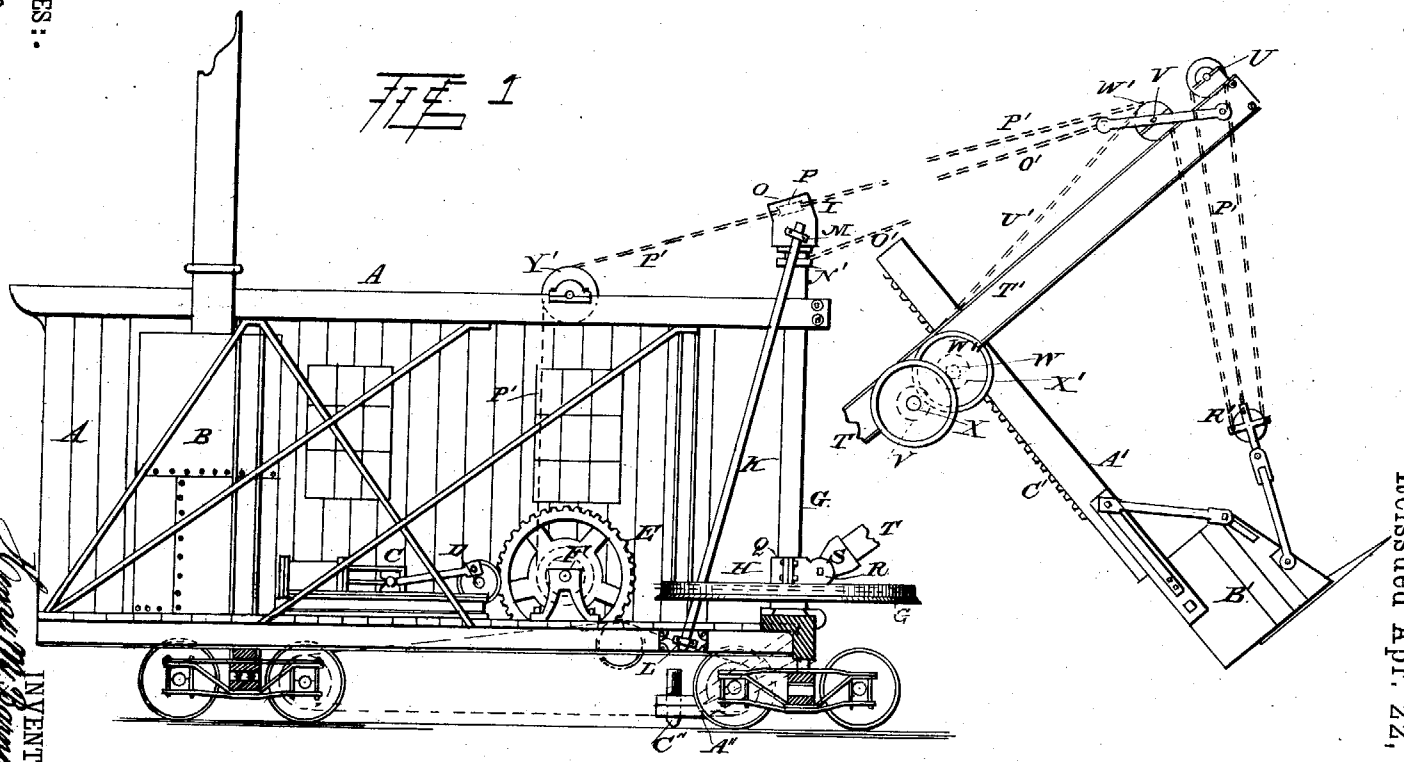
Figure 2:
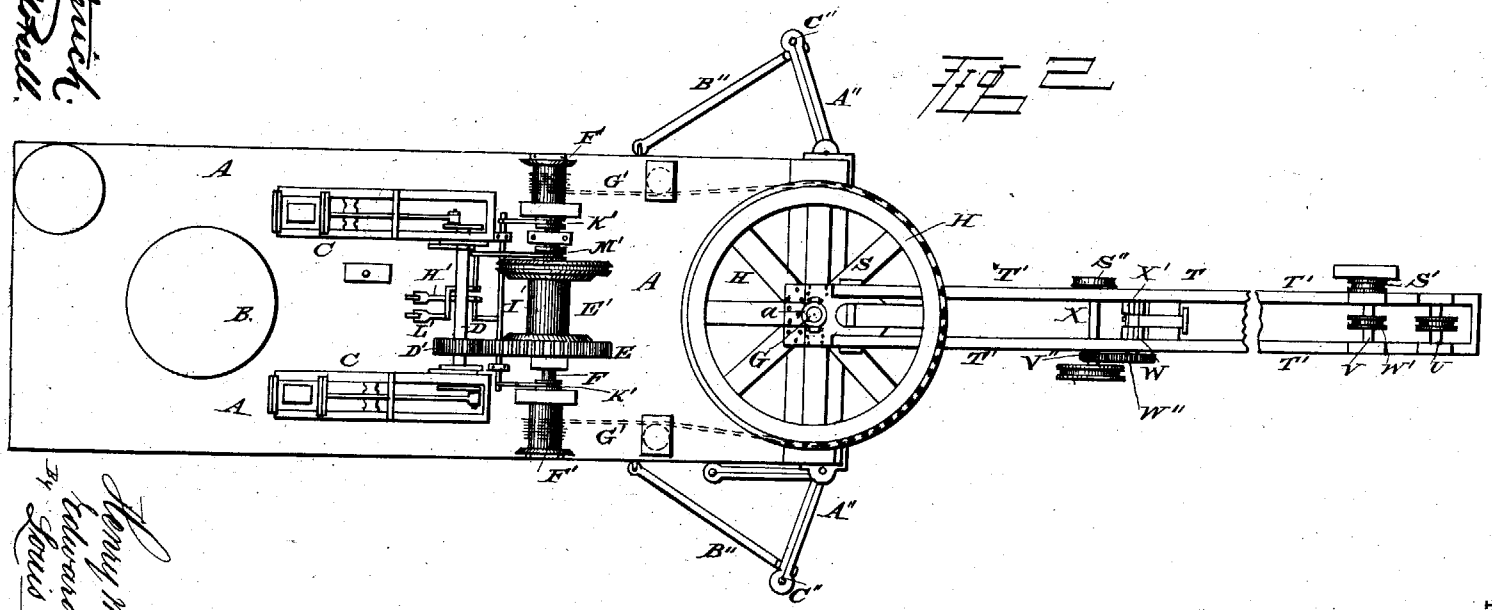
Figure 3:
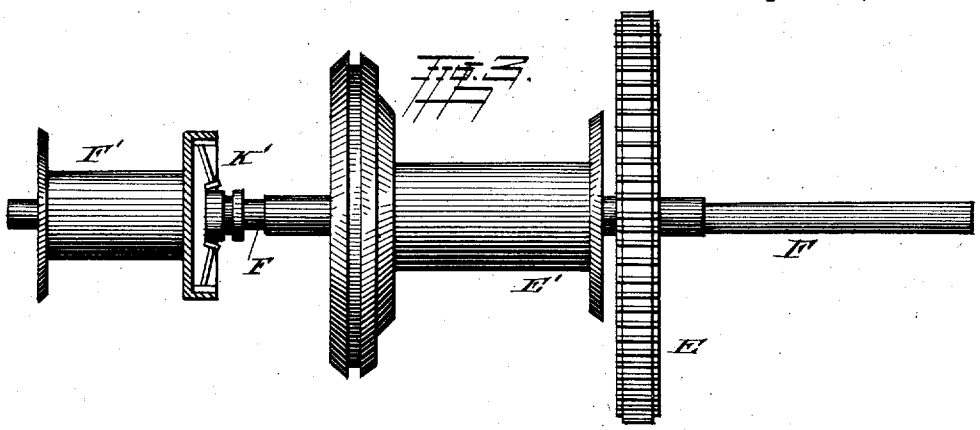
Figure 4:
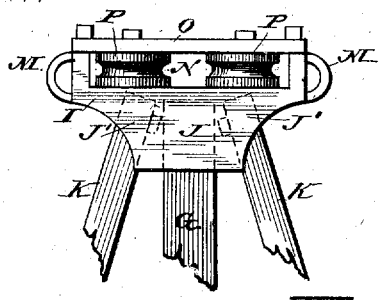
Figure 5:
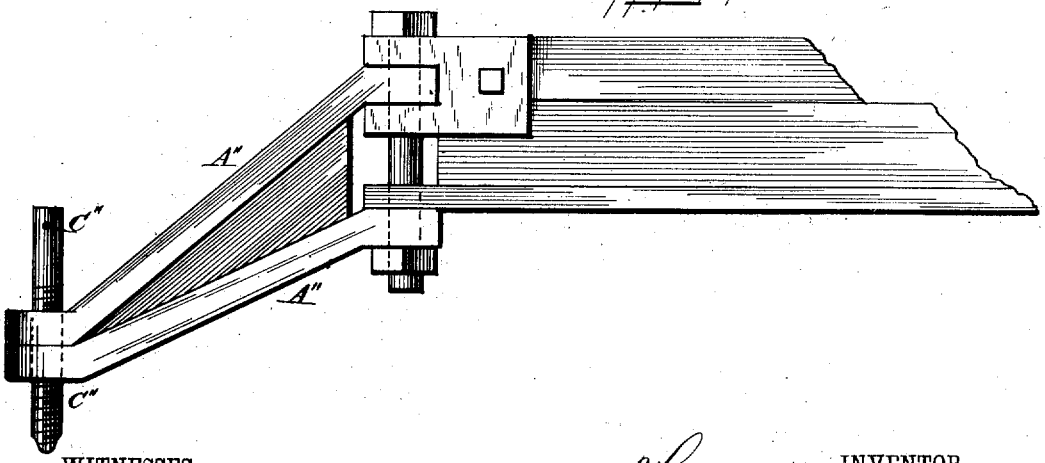

Figure 1 is a side view of our improved traveling crane with the side of the car removed. Fig. 2 is a top view of the same with the top of the car removed; and Figs. 3, 4, and 5 are detail views of different parts of our invention, which will be hereinafter described.

Similar letters of reference indicate corresponding parts in all the figures.

Our invention has relation to traveling cranes; and it consists in the improved construction and combination of parts of a crane which is adapted to be employed in digging out embankments or other work of a similar character, as will be hereinafter more fully described and claimed.

In the accompanying three sheets of drawings, A represents a car having in its rear part a boiler, B, and engines C C, which are all of ordinary construction, and which furnish the power by which the drive-shaft is rotated. The drive-shaft D is hung in suitable bearings upon the bottom of the car, and has secured upon it a pinion, D′, adapted to mesh with a gear-wheel, E, secured upon the shaft F.

G represents the mast, which is rigidly secured in a vertical position upon the front platform of the car A, the lower end of the mast passing through the center of the turn-table H, while upon the top of the mast is affixed the head I, a detail view of which is shown in Fig. 4. This head is cast with a vertical socket, J, into which the top of the mast fits, and with inclined sockets J′, into which the ends of braces K are fitted, the lower ends of said braces fitting into sockets L, secured to the sides of the car.

Upon the sides of the head are cast staples M, to which supplemental bracing-chains may be attached when work of an exceptionally heavy character is being performed, for the purpose of still further strengthening the mast.

In the top of the head I is a recess or space, N, which is covered by a plate, O, in which recess is pivoted or journaled the sheaves P, secured in the recess in such a manner as to leave a space between them, through which the hoisting-chain passes.

H represents the turn-table, which is provided with an aperture in its center, through which the lower end of the mast G passes, the turn-table being provided with a collar, Q, fitting around the lower part of the mast and extended on one side to form jaws R, between which is pivoted the end of a metal shoe, S, secured upon the lower end of the crane T. The crane T is formed of the two side pieces T′ T′, through which pass the shafts U, V, W, and X, the shafts U and V being secured near the upper end of the crane, while the shafts W and X are located at about its center, for the purpose hereinafter described.

A′ indicates the beam, upon the lower end of which the scoop or dipper B′ is secured, the beam A′ being provided on its lower edge with a rack, C′, and being made of such a thickness as to pass readily through the space between the two side pieces of the crane.

Upon the shaft F, previously referred to, is loosely journaled the central hoisting-drum, E′, while near either end of the said shaft is loosely journaled a drum, F′, each of the drums F′ having secured to it one end of a chain, G′, which passes around the turn-table H and serves to swing the said table in either direction, as hereinafter described.

H′ indicates a pivoted lever one end of which is secured to the center of a frame, I′, the ends or arms of which engage with the loosely-journaled drums F′, so that by shifting the lever H′ to either side either one of the drums F′ can be caused to engage with suitable friction-clutches, K′, on the shaft F, by which arrangement either one of the drums F′ can be caused to revolve, while the other remains loose to revolve by tension of chain. In other words, it will be seen that shaft F always runs in one direction, without regard to whether it is desired to turn the turn-table to the right or left; hence there need be no stoppage of the machinery, or of shaft F, for the purpose of reversing the motion of the turn-table, as in the case of mechanism by which the turn-table is reversed by reversing the shaft by means of which it is operated, and we also avoid the lost motion and backlash which would be caused if it were necessary to reverse shaft F every time it is desired to reverse the turn-table and crane. By means of the pivoted lever L′ and the friction-clutch M′ the hoisting-drum E′ can be caused to revolve with the shaft F or to remain stationary, as may be desired.

N′ indicates a metal collar, which fits loosely upon the upper part of the mast G, immediately below the head I, a chain, O′, passing around the said collar and being connected to the upper end of the crane T.

P′ represents the hoisting-chain, which has one end secured to the hoisting-drum E′, the other end being passed over a sprocket-wheel, Y′, hung in suitable bearings in the top of the car, then through the head of the mast in the space between the two sheaves, P P, then over a sprocket-wheel, W′, secured upon the shaft V, around a sprocket wheel or pulley which is hung between arms which are secured at their other ends to the front part of the scoop B′, then over a sprocket-wheel secured upon the shaft U, the extremity of the chain being then fastened to the shell or casing of the pulley R′.

Upon one end of each of the shafts V and X is journaled a sprocket-wheel, S′ S″, a chain, U′, passing around the said wheels. Upon the other end of the shaft X is a pinion, V″, adapted to mesh with a gear-wheel, W″, on the outer end of the shaft W, that part of the shaft W which lies between the sides of the crane being provided with a pinion, X′, adapted to mesh with the rack C′ on the lower side of the beam A′.

A″ A″ represent swinging jack-beams or lateral supports, which are hinged one to either side of the car, near its front end. When the crane is on the road the hinged supports are folded back against one side of the body of the car, while when the crane is being operated the jack-beam is swung out to any desired angle, and is secured in its adjusted position by means of a rod, B″ B″, as shown in Fig. 2 of the drawings, the jack-screw C″ being turned down until its end bears against the ground.

The manner in which our improved traveling crane is operated is as follows: The scoop or dipper B′ being full of the dirt or rock from the embankment which is being dug away, the lever L′ is thrown to one side to engage the hoisting-drum E′ with the friction-clutch M′, which causes the hoisting-drum to revolve with the shaft F, thereby winding up the hoisting-chain P′ and raising the scoop B′ to its highest point. To swing the scoop to one side, for the purpose of emptying its load from it, the operator throws the lever H′ to one side, in order to engage either one of the drums F′ with its friction-clutch, when the drum so connected will revolve with the axle F, thereby winding around itself one end of the chain G′, the other end of the said chain being at the same time unwound from the loose drum F′, the chain G′ swinging the turn-table H and the crane T, which is pivoted at its lower end to the turn-table, to either side, at the will of the operator, and without reversing or stopping shaft F. By moving the lever L′ to one side, the hoisting-drum E′ may be released from the friction-clutch M′, when the hoisting-chain P′ will be unwound from the drum E′ by the weight of the scoop or bucket B′, which may be thus allowed to descend for the purpose of refilling. By running the hoisting-chain through between two sheaves, P, in the head of the stationary mast G, the hoisting-chain will bear squarely against one of these sheaves, no matter to which side the crane is swung, and will thereby work with the least possible amount of friction. By the use of the swinging jack-beams or lateral supports A″ A″, the body of the car can be securely braced to prevent the car from being overturned to either side when the crane is being swung to one side with an unusually heavy load upon it.

From the foregoing description, taken in connection with the accompanying drawings, the construction and operation of our improved traveling crane will readily be understood without requiring further explanation.

It will be seen that by constructing the drums F′, chain G′, and turn-table H in the manner described, the crane can be easily and readily swung to either side, at the will of the operator, without stopping or reversing the operating-shaft F, which always runs in one direction only.

Having thus described our invention, we claim and desire to secure by Letters Patent of the United States—

1. In a crane of the described class, the combination of a single hoisting-shaft, F, running in one direction, whether the load is to be raised or lowered, the chain-drums F′, journaled loosely upon the same shaft, and the clutch mechanism for coupling the drums to the shaft, whereby the crane-post may be turned right or left without reversing the shaft, substantially as and for the purpose shown and set forth.

2. The mast G, provided with a head, I, having a recess, N, in its top, in which are journaled the sheaves P and sockets J′, adapted to receive the ends of the braces K, as and for the purpose shown and set forth.

3. The head I, having a recess N, in its top, in which are journaled the sheaves P and sockets J and J′ J′, adapted to receive the head of the mast G and the ends of the braces K, as set forth.

4. The combination of the swinging jack-beams A″ A″, provided with jack-screws C″ and rods B″, by which the jack-beams are secured in their adjusted position, as and for the purpose shown and set forth.

5. The combination of the shaft F, the engine for rotating the same, the drums F′, journaled loosely upon the shaft, near each of its ends, the friction-clutches K′, the levers for operating said clutches, the chain G′, passing around the turn-table H, and secured at either end to the sliding drums F′, turn-table H, adapted to be rotated by the chain G′, hoisting-drum E′, loosely journaled upon the shaft F at its central part, friction-clutch M′, the lever for operating the clutch, hoisting-chain P′, mast G, pivoted to the turn-table, near its center, and provided with a head, I, and collar N′, loosely secured upon the mast G, below the head, and connected to the upper end of the crane T by a chain, O′, all constructed and combined as and for the purpose shown and described.

In testimony that we claim the foregoing as our own we have hereunto affixed our signatures in presence of two witnesses.

HENRY M. BARNHART,
EDWARD HUBER.

Witnesses:
J. E. DAVIDS,
C. E. SARGENT.